July 16, 1940.  G. E. PORTER  2,207,700

CONTROL MECHANISM

Filed April 17, 1939  2 Sheets-Sheet 1

INVENTOR
Gilbert E. Porter.
BY
Harness, Dickey & Pierce
ATTORNEYS.

July 16, 1940.　　　G. E. PORTER　　　2,207,700
CONTROL MECHANISM
Filed April 17, 1939　　2 Sheets-Sheet 2

INVENTOR
Gilbert E. Porter
BY
Harness, Dickey & Pierce
ATTORNEYS

Patented July 16, 1940

2,207,700

UNITED STATES PATENT OFFICE 2,207,700

CONTROL MECHANISM

Gilbert E. Porter, Detroit, Mich., assignor, by mesne assignments, to Power Devices Development Company, East Detroit, Mich., a corporation of Michigan Application April 17, 1939, Serial No. 268,218

18 Claims. (Cl. 188—152)

This invention relates to control mechanism and particularly for mechanism of the vacuum operated type particularly adaptable for controlling the clutches and brakes of automotive vehicles or the like, the principal object being the provision of a new and improved construction simple in design, economical to manufacture and which may be installed in a quick and efficient manner.

Objects of the invention include the provision of a vacuum actuated device for the brakes or clutches of automotive vehicles including a vacuum operated member having a movable wall and a control member associated in a unit therewith, the unit being applicable to and removable from a motor vehicle as such; the provision of a vacuum operated device for actuating and controlling the actuation of the brakes or the clutch of an automotive vehicle comprising a unit embodying all of the essential elements of the actuating and controlling mechanism and applicable to already existing vehicles or to vehicles in the process of manufacture; the provision of a unitary device of the type described including a vacuum actuated movable wall adapted for association with the brakes or the clutch of an automotive vehicle, the movable wall having an associated control valve movable therewith and pedal means arranged in adjacent relationship with respect to the movable wall for actuating the valvular means; the provision of a structure as above described that is applicable directly to the usual clutch or brake pedals of an automotive vehicle; and the provision of a unitary clutch or brake control mechanism including a base plate and a member pivotally associated therewith, a bellows being extended between the base plate and the member and adapted to actuate the member when interiorly subjected to a partial vacuum, and the member adapted for direct association with the clutch or brake pedal of an automotive vehicle to effect actuation thereof, the aforesaid member carrying a control valve controlling the admission of sub-atmospheric pressure to the interior of the bellows and a control member being directly associated with the aforesaid member for controlling the valve; and the provision of a device of the type described that may be manually actuated in a conventional manner upon failure of the source of suction.

Other objects of the invention include a device of the type described in which the master cylinder of a hydraulic braking system is incorporated as an element of the unit; the provision of a unitary assemblage including a master cylinder having a piston and a vacuum operated movable wall connected to the piston for effecting actuation thereof, the movable wall carrying a valve for controlling the application of subatmospheric pressure to the interior face of the movable wall and a control pedal being operatively associated with the movable wall for controlling the valve; the provision of a construction as above described including a liquid reservoir for the hydraulic braking system; and the provision of a unitary assemblage including a master cylinder and reservoir for a hydraulic braking system together with a vacuum operated bellows, a control valve for the same, and a control pedal for the valve, all associated into a unitary assemblage applicable to and removable from a motor vehicle as such.

Further objects of the invention include the provision of a novel and simple form of mechanism for imparting a reaction in the control pedal for a vacuum operated brake or clutch actuating mechanism to give the operator a feel of the brake or clutch; to provide a vacuum operated mechanism for actuating the brake or the clutch of a motor vehicle including a control pedal together with a novel means for mounting the control pedal with relation to the actuated part whereby the operation of the control pedal is resisted by a force proportional to the amount of force applied by the vacuum operated mechanism to the actuated part; the provision of a construction as above described in which the movable wall of the vacuum operated member is directly associated with the control pedal therefor; the provision of a construction as above described in which the movable wall of the vacuum operated member cooperates with the control pedal and during operation tends to rotate the control pedal in a direction opposite to that required to actuate the associated control valve to effect continued operation of the vacuum operated member; and the provision of a unitary brake or clutch actuating mechanism for motor vehicles and the like including a vacuum actuated bellows or its equivalent having a movable wall, a valve for controlling the same, and a foot pedal for controlling the valve so associated with the vacuum operated member as to resist operative movement thereof by a force proportional to the force applied by the vacuum operated member upon the clutch or brake, the vacuum operated member, valve and pedal all being arranged in a unitary assemblage applicable to and removable from a motor vehicle or the like as such.

Further objects include the provision, in a device of the type above described, of an inertia operated member for resisting too severe application of the brakes of a vehicle; and the provision of an inertia operated member forming a part of the unitary assemblage described operable under a force proportional to the deceleration of a vehicle to oppose the force exerted by the operation of the vehicle in causing such deceleration.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views.

The desirability of employing vacuum operated mechanism to aid in the actuation of the clutches or brakes of motor vehicles is well recognized in the art and a number of different constructions for this purpose have gone into relatively wide use, particularly on factory equipped jobs. The application of such mechanism to already existing motor vehicles has not been so widespread chiefly because of the added expense involved but also because only a limited number of such constructions have provided certain features considered essential to the commercial practicability of such mechanisms. One of the chief drawbacks to the sale of such mechanism to already existing motor vehicles is the relative high cost of installation as heretofore such structures have invariably required substantial changes in the already existing braking structure when applied to brakes and seemingly unnecessary complications when applied to both clutches and brakes. The present invention obviates the above described disadvantages of the heretofore suggested construction in that it provides a unitary assemblage including all of the elements required to actuate the clutch or the brake of an automotive vehicle and is applicable to or removable from the motor vehicle as a unit. It may be applied to a motor vehicle without any alteration of any sort whatever in the clutch or braking systems although in most cases it will be desirable to remove the usual pedal pads associated with the clutch and brake pedal levers. This feature renders the construction particularly adaptable to already existing motor vehicles although it will be readily understood that it is equally well adaptable to motor vehicles in the process of manufacture. The construction furthermore provides the desirable feature of employing a so-called follow up valve in the application of a sub-atmospheric pressure to the movable wall of the vacuum operated member so as to enable controlled actuation of the same, and further is preferably such as to provide a feel in the operator of the extent of pressure being applied to the clutch or the brake proportional to the amount of pressure being applied to these members in order to actuate the same.

Figure 1:
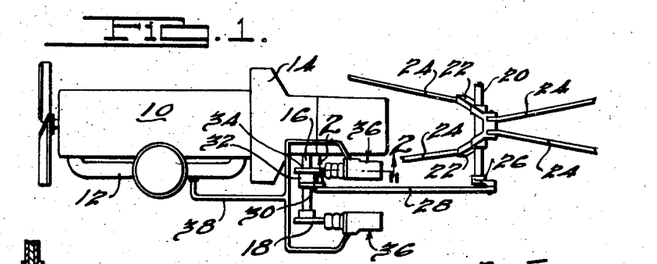
Fig. 1 is a more or less diagrammatic plan view of the power plant for a motor vehicle illustrating the application of the present invention to the control of both the clutch and the brakes thereof.

Referring now to the accompanying drawings and particularly to Figs. 1 to 6, inclusive, it will be noted that in Fig. 1 the power plant of a motor vehicle is illustrated more or less diagrammatically to disclose the application of the present invention thereto. The power plant includes an engine indicated generally at 10 of the usual internal combustion type having an intake manifold 12, a clutch housing 14 fixed to one end of the engine and including a clutch (not shown) of conventional construction and the control of which is taken care of in a conventional manner by means of a rotatable shaft 16 carried by the clutch housing and the rotatable movement of which is adapted to be controlled in a conventional manner by means of a clutch pedal lever 18 fixed to the shaft 16. The braking system for the associated vehicle may include a cross-shaft 20 carrying a pair of double armed levers 22 fixed thereto between their ends and the free end portions of which are suitably connected to brake rods 24 which may extend directly or indirectly to the brakes (not shown) on the various wheels of the vehicle. The cross-shaft 20 is provided with an additional lever 26 connected by means of a link 28 to a short lever 30 shown in the present case and for the purpose of illustration only as being fixed to a sleeve 32 rotatably mounted upon the shaft 16 and also to which is fixed a usual or conventional brake pedal lever 34. Two units, each indicated generally at 36 in Fig. 1, constructed in accordance with the present invention are provided, one in association with each the clutch lever 18 and brake lever 34 and these units 36 are connected by means of suitable tubes 38 with the interior of the intake manifold 12 so as to afford a source of suction for each of the units 36.

Inasmuch as each of the units 36 are substantially identical in construction, and may in fact be identical in construction, it will be necessary here to describe one of them only and for that purpose it will be assumed that the unit hereinafter described will be that employed for the control of the brakes and, for that reason, specific reference hereafter will be made both in the specification and claims to the application of the present invention to brakes only, its application to the clutch or to other uses being made apparent to those skilled in the art thereby.

Figures 2, 3, 9:
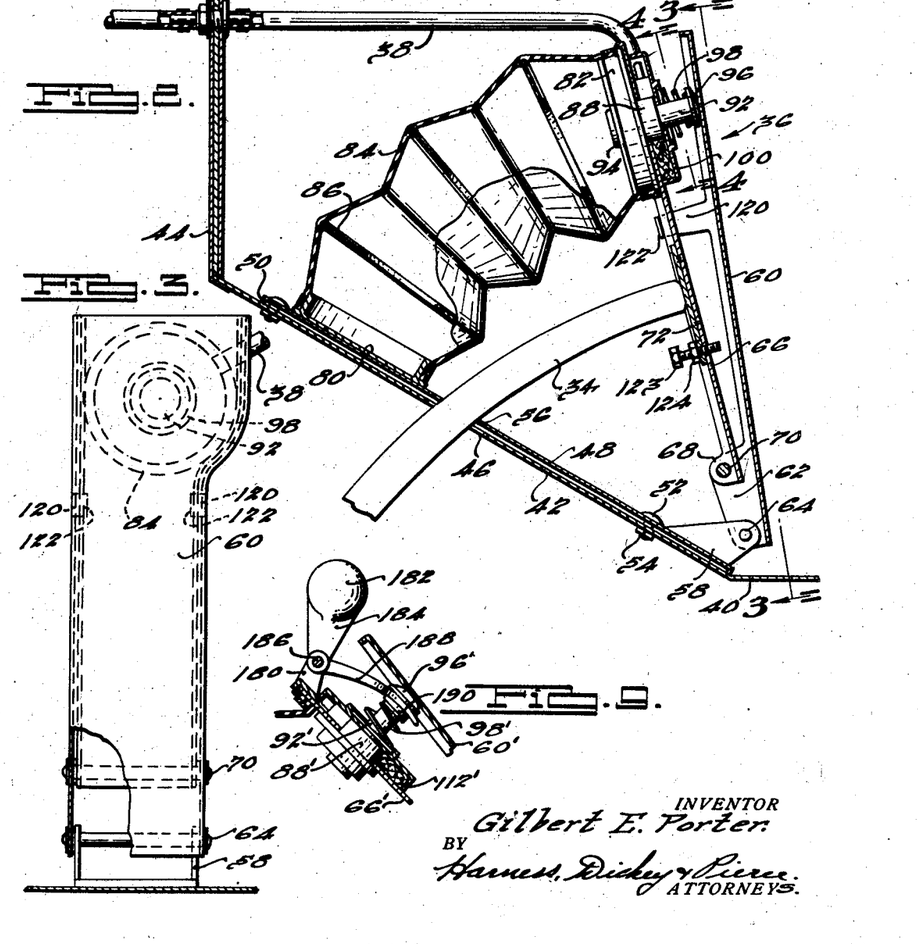
Fig. 2 is an enlarged fragmentary, vertical sectional view taken on the line 2—2 of Fig. 1.
Fig. 3 is a face view of the foot pedal shown in Fig. 2 taken as on the line 3—3 thereof, the same being shown in broken condition to better illustrate the construction of the same.
Fig. 9 (Sheet #1) is a fragmentary, partially broken, partially sectioned view illustrating the application of an inertia operated member to either of the constructions shown in the previous views to obtain further desirable results.

Referring now to Fig. 2 the usual floor board of a motor vehicle is illustrated at 40 and as joining at its forward end the usual toe board 42 which extends upwardly and forwardly therefrom and joins at its forward end the vertically extending dash 44, all of which is conventional. The brake pedal lever 34 projects through a suitable opening 46 in the toe board 42 in a conventional manner, and it will be understood from an inspection of Fig. 2 that the usual pedal pad conventionally provided at the upper ends of such brake pedal levers has been removed in any suitable manner and such end preferably slightly rounded as indicated.

In accordance with the present invention a base plate 8 preferably formed from sheet metal to the shape shown and which is of substantially flat character having downwardly turned short marginal edge flange portions 50, is secured to the toe board 42 by means of bolts 52 and nuts 54 in surrounding relation with respect to the brake pedal lever 34, it being provided with an opening 56 therein substantially matching the openings 46 and providing passage of the brake pedal lever 34 therethrough. It will be noted from an inspection of Fig. 3 that the base plate 48 is of approximately rectangular formation except that adjacent its upper end it is slightly increased in width to accommodate the full extent of the corresponding end wall of the bellows to be hereinafter more fully described.

Adjacent its lower end the base plate 48, at opposite sides thereof, is provided with a pair of preferably integral lugs or ears 58 arranged with the planes thereof extending perpendicularly with respect to the plane of the base plate 48. A foot pedal 60 of the same general contour as the base plate 48 is provided at the lower end thereof with inturned flanges 62 at the opposite sides thereof which straddle the ears 58 and are pivotally connected thereto by means of a pin 64 for movement toward and away from the base plate 48.

An additional member 66 preferably formed from sheet metal and also having at its lower end a pair of inwardly turned lugs or ears 68 at the opposite sides thereof fitting within the flanges 62 of the pedal 60 and disposed between the base plate 48 and the pedal 60, is pivotally connected to the pedal 60 by means of a pin 70. The member 66 is adapted to be connected to the brake pedal lever 34 and while this may be accomplished by any suitable means such as linkages, rollers or the like, for the purpose of simplicity only the member 66 is shown as being provided with a wear plate 72 suitably secured thereto as by spot welding or the like and in a position to abut the outer or free end of the brake pedal lever 34. The wear plate 72 may be of a hardened metallic material to better withstand the wearing action of its contact with the brake pedal lever 34, or any other suitable material.

While either a piston and cylinder or a bellows may be employed to provide a suction operated movable wall as the power applying element, the bellows being of lighter, simpler and more economical construction, it is shown by way of illustration. Accordingly, the base plate 48 has secured thereto above the opening 56 therein an upwardly opening cup-shaped member 80 and the upper end of the member 66 is provided with a similar forwardly and downwardly opening cup-shaped member 82 suitably fixed thereto. The members 80 and 82 form the opposite end wall portions of a collapsible bellows 84 preferably formed from rubber or other suitable flexible material and the opposite ends of which are sealed and fixed to the members 80 and 82 in any suitable manner. The particular bellows 84 shown is illustrated as being constructed of rubber and as being interiorly provided with rigid metallic rings 86 at the points of maximum diameter thereof to prevent bodily collapse of the bellows under the influence of partial vacuum therein.

Figure 4:
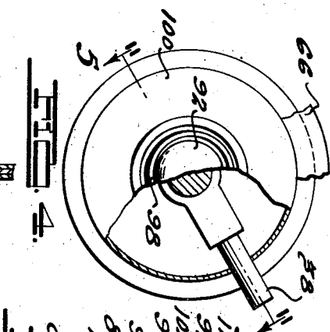
Fig. 4 is an enlarged, partially broken, sectional view taken on the line 4—4 of Fig. 2 and particularly illustrating the head of the actuating bellows and the control valve carried thereby.
Figure 5:
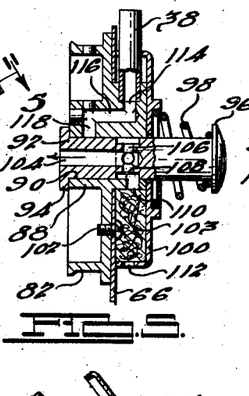
Fig. 5 is a sectional view taken on the line 5—5 of Fig. 4 in a plane passing axially through the control valve and illustrating the control valve in its inoperative position.
Figure 6:
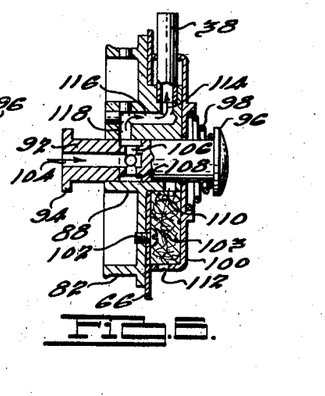
Fig. 6 is a view similar to Fig. 5 but illustrating the control valve in its operative position.

Referring now particularly to Figs. 4, 5 and 6 it will be noted that the upper cup-shaped member 82 forming the upper end wall of the bellows 84 forms the base of a control valve which may be of any suitable type of follow up valve but is here shown by way of illustration as of the plunger type. It includes a main body portion 88 formed integrally with the end 82 and is centrally provided with a bore 90 in which a cylindrical valve member or plunger 92 is reciporcably received. The valve plunger 92 is provided with an out-turned flange 94 at its lower or inner end and a head 96 at its outer end, a coiled spring 98 being maintained under compression between the head 96 and a cover member 100 overlying the outer end of the valve body and constantly urges the plunger 92 outwardly to an inoperative position, such outward movement being limited by contact of the inner flange 94 with the body 88 of the valve. The cover member 100 overlies the outer face of the member 66 while the cup-shaped member 82 lies in contact with the inner face thereof. Screws 102 extending through the member 66 and threaded into the bottom wall of the cup-shaped member 82 serves to secure the member 82 and the valve mechanism carried thereby in fixed relation with respect to the member 66. The cover member 100 is resiliently maintained in position by the spring 98 which permits it to be lifted to replace suitable porous filtering material 103 enclosed by it, without dismantling any parts of the apparatus.

The valve plunger 92 is provided with an axial bore 104 extending from its inner end to a point substantially mid-way its length where it is connected by means of cross-passages 106 to an annular passage or chamber 108 formed in its exterior surface adjacent such location. The body 88 of the valve is provided with an opening 110 therethrough which, when the flange 94 of the valve 92 lies against the inner end of the valve body, is aligned with the passage 108. The cover member 100 is provided with one or more openings 112 therein which thus communicates the atmosphere to the interior of the cover 100 where it is communicated through the filtering material 103 and the passages 110, 108, 106 and 104 with the interior of the bellows 84 to thus place the device in inoperative position. The body 88 of the valve is also provided with passages 114, 116 and 118 the latter of which opens into the bore 90 at a point spaced axially of the valve inwardly of the passage 110.

The passage 114 is suitably connected to one of the tubes 38 which as previously explained communicates with any suitable source of suction, here shown by way of illustration as the interior of the intake manifold 12 of the engine 10 which thereby provides a source of suction for actuating the apparatus. At least that portion of the tube 38 extending between the valve body 38 and the dash 44 is of a readily flexible nature. It will be noted that when the valve plunger 92 is in the inoperative position to which it is urged by means of the spring 98, the passage 118 is closed to the bore 90. However, when pressure is applied to the head 96 of the valve plunger 92 so as to cause it to move inwardly or to the left as viewed in Figs. 5 and 6 from the inoperative position illustrated in Fig. 5 to the operative position illustrated in Fig. 6, the inward movement of the valve plunger 92 first moves the annular chamber 108 out of registry with the passage 110 and, therefore, closes communication of the interior of the bellows with the atmosphere, and shortly thereafter during continuous inward movement of the valve member 92 the annular passage 108 becomes aligned with the passage 118 whereupon the partial suction of the manifold 12 is communicated through the tube 38, passages 114, 116 and 118 and then through the annular chamber 108 and passages 106 and 104 with the interior of the bellows 84 which tends to collapse the bellows and draw the opposite ends 80 and 82 thereof toward each other. The valve member 92 is thus actuated from the inoperative position illustrated in Fig. 5 to the operative position illustrated in Fig. 6 through the medium of the pedal 60 the upper end of which is adapted to and bears against the head 96 of the valve plunger.

The force of the spring 98 is sufficient to maintain the pedal 60 in inoperative position when free of pressure from the foot of the operator, or at least free of substantial pressure, and means are preferably provided for limiting movement of the pedal 60 away from the head 96 of the valve. One form of means for accomplishing this result is illustrated in the drawings as comprising lugs 120 extending inwardly from opposite sides of the pedal 60 below the upper head of the bellows 84 and provided at their inner ends with inturned end portions 122 which underlie the corresponding marginal edge portions of the members 66. Means are also preferably provided for providing an adjustable stop for limiting the amount of opening of the valve so as to provide either a slow operating brake, a fast operating brake, or any speed of operation between these limits. As an illustration of one form of such means a screw 123 is threaded upwardly through the wear plate 72 and member 66 with its upwardly and rearwardly projecting end in a position to contact the pedal 60 and thus limit its approach toward the member 66 and consequent operation of the valve. A conventional lock nut 124 may be provided for locking the screw 123 in adjusted position.

It will be understood that the device as illustrated in Fig. 2 is in inoperative position with the brakes of the cooperating vehicle released and the valve in the position illustrated in Fig. 5 in which the interior of the bellows 84 is in open communication with the atmosphere. Although, separate spring means may be employed to maintain the member 66 in its fully spaced relation with respect to the base plate 48, this will ordinarily not be required for the reason that the usual springs (not shown) associated with both the clutch and brake mechanism of motor vehicles will constantly urge the associated pedal lever towards its fully released position which will serve to maintain the member 66 in its fully inoperative position shown. If now the operator desires to apply the brakes, in the case assumed, the ball or toe of his foot is placed against the upper portion of the pedal 60 and pressure is applied therethrough tending to rotate the pedal 60 in a counterclockwise direction of rotation as viewed in Fig. 2. As previously explained the initial movement of the pedal 60 in this direction will operate through the head 96 of the plunger 92 to first operate the plunger to close the interior of the bellows 84 to the atmosphere and then open the interior of the bellows to the effects of the suction then existing within the intake manifold 12. Also as previously explained the effects of the suction in the intake manifold 12 will tend to collapse the bellows 84 and tend to draw the heads 80 and 82 toward one another, and the head 80 being fixed with respect to the toe board 42 the head 82 will be drawn toward it and will tend to rotate the member 66 in a counterclockwise direction about the pivot pin 70 as viewed in Fig. 2. The member 66 in thus rotating in a counterclockwise direction of rotation will act against the end of the pedal lever 34 to depress such end and to move the associated brake mechanism in a direction tending to apply the brakes.

If the operator, after effecting an initial movement of the pedal 60 in an operating direction sufficient to effect an initial operation of the mechanism as described, arrests further inward movement of the pedal 60, the inward movement of the valve plunger 92 will be arrested and the continued inward movement of the member 66 and head 82 of the bellows under the influence of the suction remaining in the bellows will cause a relative outward movement of the valve plunger 92 with respect to the body 88 of the valve until the annular passage or chamber 108 in the valve plunger 92 is brought out of registry with the cooperating end of the passage 118 at which time further drop in suction in the interior of the bellows 84 will be discontinued and the various parts will assume a position of rest at the point thus reached. If the operator now presses the pedal 60 further downwardly in an operative direction the valve plunger 92 will again be moved into position to communicate with the interior of the bellows 84 with the interior of the intake manifold 12 and effect a further contraction of the bellows 84 and further application of the brakes.

Thus the brakes may be applied in the above described manner in a step-by-step operation or, as will be appreciated, if the operator presses the pedal 60 with sufficient force to maintain the valve plunger 92 in a position to maintain the interior of the bellows 84 in constant open communication with the interior of the intake manifold 12, and causes the pedal 60 to follow the movement of the member 66 downwardly during the application of the brakes, the brakes may be completely applied in a single movement. On the other hand regardless of the extent to which the bellows has been collapsed by operation of the pedal 60 as above described, if at any position in the operation of the mechanism the operator relieves the pressure on the pedal 60, the spring 98 will immediately move the valve plunger 92 to shut off communication of the bellows 84 with the interior of the intake manifold 12 and will open such interior to the atmosphere through the passages described, upon which the mechanism will immediately return to inoperative position and release the brakes.

Thus with the construction above described the pedal 60 may be operated to obtain any desired degree of braking movement of the brake pedal lever 34 and consequently any degree of braking desired on the vehicle may be obtained by a proper manipulation of the pedal 60. It will also be appreciated that should, for any reason whatever, the suction in the intake manifold 12 be destroyed or its proper connection with the mechanism be interrupted, the operator of the vehicle may, by simply pressing down on the pedal 60, effect manual operation of the brakes in the same manner as though the vacuum operated mechanism was entirely eliminated. This feature is a safety measure insuring complete control over the operated clutch or brake mechanism under any possible condition of use.

As previously mentioned it is desirable in constructions of the type herein involved that some means be provided for giving the operator of the vehicle a feel of the brakes or clutch operated by the vacuum actuated mechanism, and this is provided by imparting to the pedal 60 a reacting force proportional to the amount of pressure being applied to the pedal lever 34 tending to resist actuation of the pedal 60. The construction described provides this reacting force in the following manner. As the head 82 of the bellows is drawn inwardly under the influence of a suction or partial vacuum within the bellows 84, it tends to pivot the member 66 about its point of contact with the free end of the pedal lever 34. In other words as the bellows draws the upper end of the member 66 forwardly or inwardly it tends to rotate the lower end of the member 66 outwardly or rearwardly. Because of the fact that the pivot pin 70 by means of which the member 66 is pivoted to the pedal 60 is disposed in spaced relation to and above the pivot pin 64 by means of which the pedal 60 is pivoted to the base plate 48, this force tends to rotate the pedal 60 in a clockwise direction of rotation as viewed in Fig. 2 in opposition to the force which the operator applies to the pedal 60 in order to effect actuation of the mechanism. Inasmuch as the force required to actuate the pedal lever 34 and consequently the brakes of the vehicle increases as the pedal lever 34 is moved inwardly, the reactive force exerted to the member 66 tending to rotate the pedal 60 in a direction opposite to that to which it is urged by the foot of the driver increases, and because the connection between the bellows 84 and pedal 60 providing this reaction is through a simple system of leverages it will be appreciated that the reactive force in the pedal 60 is at all times proportional to the force which is exerted upon the pedal lever 34 and consequently upon the brakes of the vehicle. Thus the reactive force which is felt by the operator of the vehicle in applying pressure through his foot to actuate the pedal 60 is always proportional to the actual pressure which is being applied to the brake or the clutch of the vehicle, as the case may be, and accurately apprises him at all times of the relative pressure which is being applied to the device. The actual amount of such pressure may, of course, be varied to meet the desires of the particular designer by varying the spacing of the pivot pins 64 and 70, by varying the point of application of the force of the bellows 84 on the member 66 with respect to the point of contact of the pedal lever 34 therewith, or by varying both. Thus with the construction described it is readily possible to obtain any desired degree of brake or clutch actuation of the vehicle and the force of such clutch or brake actuation is at all times made instantly apparent to the operator through the reactive force set up in the pedal 60.

It will be appreciated that the base plate 48, pedal 60, member 66, bellows 84 and control valve mechanism constitutes a unitary assemblage which may be simply secured to the toe board of a motor vehicle over either the brake or clutch pedal and by simply connecting it with the intake manifold of the associated engine or other suitable source of suction, instantly provides a completely operable device. As previously mentioned although it will ordinarily be advisable to remove the usual pedal pad on the end of the pedal lever 34 as indicated in the drawing, it will also be appreciated that by making the opening 56 in the base plate 48 of a sufficient size to permit the passage of the usual pedal pad therethrough, no change whatever need be made in the existing construction of a motor vehicle in order to enable the application of the present invention thereto.

It will be appreciated that a device constructed in accordance with the above disclosure is applicable to the braking system of a motor vehicle regrdless of whether the braking system is of the mechanical or of the hydraulic type as in either case the conventional brake system will include a pedal lever equivalent to the lever 34 described which will permit ready, quick and simple application of the present invention thereto. However, and particularly where the present invention is to be applied to a motor vehicle during its process of manufacture and the motor vehicle is to be provided with a hydraulic braking system, it may be preferable to resort to a construction of the general type illustrated in Figs. 7 and 8 which will considerably simplify the construction inasmuch as in such case the master hydraulic cylinder for the braking system is constructed as a unitary part of the vacuum booster device.

Figures 7, 8:
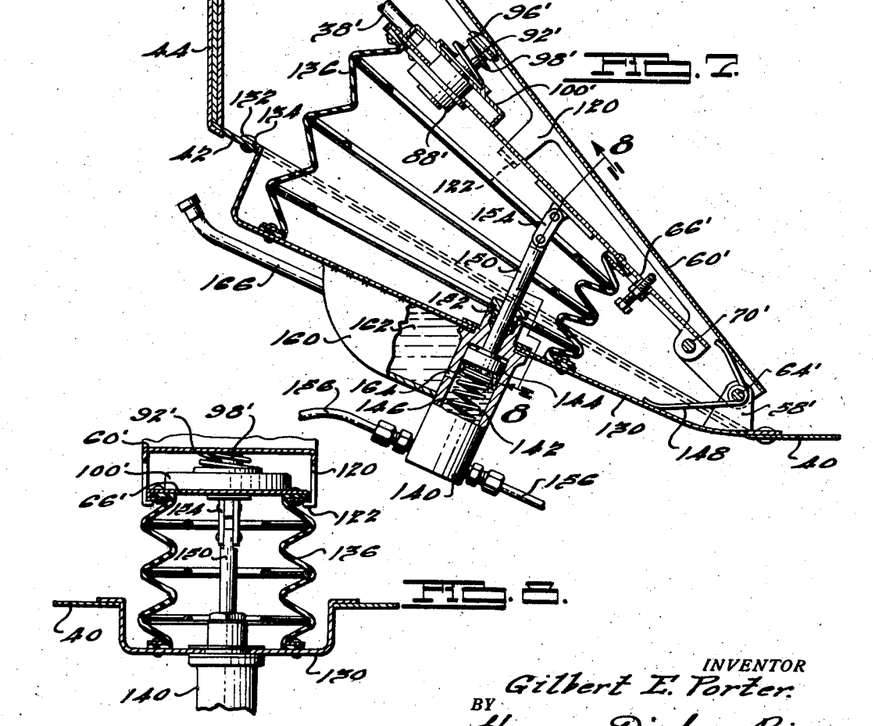
Fig. 7 is a view similar to Fig. 2 but illustrating a modified form of construction particularly adapting the present invention to hydraulic braking systems.
Fig. 8 is a transverse sectional view taken on the line 8—8 of Fig. 7.

Referring now to Figs. 7 and 8 it will be observed that instead of employing a base plate such as the base plate 48 previously described, a base plate in the form of a pan-like member 130 is employed, it being of a greater depth at its upper end than at its lower end and being provided with a marginal flange 132 projecting outwardly therefrom. Preferably the toe board 42 is provided with an opening of sufficient size to permit the insertion of the pan-like base 130 therethrough with the flange 132 overlying the margins of the opening and being secured to the toe board as by means of rivets 134. The base 130 is provided with ears 58' corresponding with the ears 58 previously described and with a pedal 60' and member 66' together with a valve mechanism indicated by the same numerals except that such numerals bear a prime mark as in the previously described construction. Instead of employing a bellows of the same type as the bellows 84 previously described, in this case a bellows 136 of the same general type of construction but of more or less rectangular formation in transverse section is provided between the base plate 130 and the member 66' and instead of providing separate heads for the bellows as in the previously described construction, the opposite ends of the bellows are connected and sealed directly to the base plate 130 and member 66', respectively, to obtain the same general effect. The construction and operation of these parts being identical to that in the construction previously described no specific description of these parts, nor the mode and manner of actuation thereof is necessary in connection with the modification illustrated in Figs. 7 and 8.

The main difference is that in the construction illustrated in Figs. 7 and 8 the master cylinder 140 for a hydraulic braking system is rigidly fixed to the base 130 and projects downwardly below the same. This master cylinder 140 is provided with a bore 142 in which a piston 144 is reciprocably mounted and is constantly urged toward inoperative position by means of a coil spring 146 positioned within the cylinder 140 and maintained under compression between the piston 144 and the outer end of the cylinder. An additional spring 148 may be provided as illustrated in surrounding relationship with respect to the pivot pin 64' for the pedal 60' and having opposite terminal extensions bearing against the base plate 130 and the pedal 60', respectively, for constantly urging the pedal 60' and member 66' toward inoperative position. The piston 144 is provided with a piston rod 150 which extends up into the interior of the bellows 136 and is suitably sealed against leakage therepast by means of a suitable packing gland 152. The upper end of the piston rod 150 may bear directly against the member 66', or, if desired, it may be connected by means of suitable links 154 to the member 66' as indicated. Thus when the pedal 60', is actuated in substantially the same manner as the equivalent pedal 60 in the previously described construction, the mechanism will be actuated to depress the piston 144 in the cylinder 140 and cause the braking fluid to be displaced from the cylinder 140 through the usual and conventional tubes 156 which lead to the usual and conventional wheel brake cylinders (not shown) associated with the braking mechanism on the individual wheels of the associated vehicle in order to effect actuation of the brake.

In order to provide a conventional brake fluid reservoir for the master cylinder 140, a pan-like member 160 preferably formed from suitable sheet metal or the like, is provided in association with the master cylinder 140 and preferably fixed to the base plate 130 to provide a reservoir 162 the interior of which may be brought into open communication with the interior of the cylinder 140 by means of a passage 164 through the wall of the cylinder each time the piston 144 is moved to its fully inoperative position. Means such as the tube 166 in communication with the reservoir 162 be extended to a suitable point for filling as indicated.

It will be understood that the operation of the modification shown in Figs. 7 and 8 is substantially identical to that illustrated in the previous views, the principal difference being in the incorporation of the master cylinder of the hydraulic braking system therewith and as a unitary part thereof. In other words, in this case the unit comprises a base plate, the pedal 60', the member 66', the bellows 136 and the master hydraulic cylinder assembly all of which constitutes the unitary assemblage applicable to and removable from the vehicle as such. Because of its character it obviously simplifies not only the construction and installation of the master cylinder itself but further provides for the installation of the vacuum booster mechanism at the expense of substantially no more time than required for a straight hydraulic system. It may be noted that as in the construction previously described any interruption or failure of the source of suction will have no effect on the ability to apply the brakes by manual pressure only in the conventional manner.

It may be desirable under some circumstances to provide means in connection with either of the modifications above described for automatically resisting a too severe application of the brakes of the vehicle by the operator thereof. Such a form of means is illustrated in Fig. 9 and as being applied to the construction illustrated in Figs. 7 and 8, but it will be obvious that it may be applied in the same or substantially similar form to the construction shown in Figs. 1 to 7, inclusive. As illustrated in Fig. 9 this effect is obtained by providing a pair of spaced and parallel ears 180 on the forward and upper end of the member 66'. A weight 182 is mounted upon the arm 184 of a bell crank which is pivoted between the ears 180 by means of a pin 186 so as to enable the weight to swing in a forwardly and rearwardly direction. When in inoperative position the center of mass of the weight 182 is preferably above and to the rear of the pivot pin 186. The other arm of the bell crank is indicated at 188 and extends rearwardly and downwardly from the pin 186 and is provided with a bifurcated lower free end which receives the upper end of the valve plunger 92' therein and bears against the underside of the head 96'. Preferably a washer 190 is positioned on the valve plunger 92' below the bifurcated end of the arm 188 to serve as an abutment for the coil spring 98'.

It will be appreciated that with the above described construction the spring 98' constantly urges the bell crank in a counterclockwise direction of rotation and so as to move the weight 182 to its forwardmost position. As pressure is applied to the pedal 60' in order to actuate the cooperating brakes the bell crank is urged to move in a clockwise direction of rotation. If the operator presses too hard on the pedal 60' for a normal braking operation and so as to effect an unreasonably great deceleration of the cooperating vehicle, the inertia of the weight 182 will tend to move it forwardly and cause the bell crank to rotate in a counterclockwise direction about the pivot pin 186. In thus tending to move forwardly about the pivot pin 186 the weight 182 will act through the arms 184 and 188 and tend to move the pedal 60' in a clockwise direction of rotation about its cooperating pivot pin 64 in a direction opposite to that which the operator presses the pedal 60' in order to effect actuation of the brakes. By properly proportioning the mass of the weight 182 with respect to its lever arm about the pivot pin 186, and the relative length of the arm 188, any desired degree of reaction on the pedal 60' may be obtained, but it will be appreciated that the desirable amount is that which will act upon an unreasonably severe application of the brakes, to move the pedal 60' toward an inoperative position against the force of the operator so as to automatically resist and relieve the severity of the braking action.

It will be appreciated that once the principles of the present invention are made known to those skilled in the art various modifications and changes in the illustrative embodiments of the invention herein disclosed will at once be apparent and, accordingly, that formal changes may be made in the specific embodiments of the invention described without departing from the spirit or substance of the broad invention, the scope of which is commensurate with the appended claims.

What I claim is:

1. Control mechanism comprising, in combination, a supporting member adapted for ready application to and removal from a motor vehicle, a pair of relatively movable members movably supported thereby, pressure operated means interconnecting said supporting member and one of said pair of members for effecting movement of the latter towards the former, valvular means for controlling said pressure actuated means and including a control element carried by one of said pair of members movable relative to the other of said pair of members and extending into cooperative relationship with respect to said other of said movable members whereby its movement is controlled by relative movement between said pair of relatively movable members, all of said members and means forming a unitary structure applicable to and removable from a motor vehicle as such solely by application and removal of said supporting member.

2. Control mechanism comprising, in combination, a base member formed for application to an automobile floor part, a member supported by said base member for relative movement toward and away from the same, pressure actuated means connecting said members and operable to effect relative movement therebetween, valve means carried by the second mentioned member for controlling the operation of said pressure actuated means and including a movable valve member, and a pedal member carried by said base member and movable relative thereto and to said second mentioned member so constructed and arranged with respect to said movable valve member as to effect operation thereof upon relative movement of said pedal member with respect to said second mentioned member, all of said members and means forming a self contained unitary structure applicable to and removable from an automobile solely by securement of said base member to and removal of said base member from, respectively, a floor part of such automobile.

3. Control mechanism for an actuating member including, in combination, a base member provided with an opening therein for reception of said actuating member, a pair of relatively movable members pivotally mounted on said base member and one of said pair of members being positioned for connection to said actuating member, pressure actuated means interconnecting said base member with said one of said relatively movable members and adapted to effect relative movement therebetween whereby to effect actuation of said actuating member, a control valve for said pressure actuated means, and a control element for said valve carried by one of said pair of relatively movable members and being movable relative thereto, said control element being positioned in the path of relative movement between said pair of relatively movable members whereby to be controlled by relative movement between them.

4. A self contained control mechanism including, in combination, a base member adapted for ready application to and removal from a motor vehicle, a member pivotally associated therewith, a bellows having the opposite ends thereof fixed and sealed with respect to said base member and said relatively movable member, respectively, valvular means communicating with the interior of said bellows for controlling the flow of a motive fluid with respect thereto, a movable control element for said valvular means carried by and movable relative to said movable member, and a pedal pad movably supported by said base member and movable relative to said movable member arranged in cooperative relationship with respect to said control element for controlling the operation thereof, all said members, bellows, means, element and pad forming a unitary assemblage applicable to and removable from a motor vehicle as such solely by securement and removal respectively of said base plate to and from such motor vehicle.

5. In a device of the type described, in combination, a base member, a member carried by said base member for pivotal movement toward and away therefrom, a bellows having the opposite ends thereof sealed and secured relative to said base member and said pivot member, respectively, a valve for controlling the flow of fluid into and out of said bellows carried by said pivoted member and including a valve plunger, spring means constantly urging said plunger toward a projected position with respect to said pivoted member, and a pedal pad pivotally supported by said base member arranged in overlying relation with respect to the projected end of said plunger and cooperable therewith to move said plunger against the force of said spring means.

6. In a device of the type described, in combination with a member to be actuated, a base member adapted to be fixed in position, a foot pedal pivotally mounted on said base member for movement toward and away therefrom, a second member pivoted to said foot pedal about a line spaced with respect to the pivotal axis of said foot pedal and interposed between said foot pedal and said base member and bearing intermediate its ends against said member to be actuated, fluid pressure actuated means interconnecting said base member and said second member and adapted when actuated to apply a force tending to move said second member toward said base member, valvular means for controlling the flow of fluid to and from said fluid pressure actuated means including a control member carried by said second member and operable by movement of said foot pedal relative to said second member, the resultant line of force exerted by said pressure actuated means upon said second member being exerted on said second member at a point outwardly of the point of contact therewith with said member to be actuated from the pivotal point thereof whereby the operating force of said pressure actuated member tends to rotate said foot pedal in a direction opposite to that required to move said plunger in an operative direction.

7. In a device of the type described, in combination, a base plate, a pedal pad pivotally mounted upon said base plate, a member pivotally supported by said base plate between said base plate and said pedal pad and movable relative to both thereof, a bellows interconnecting said base plate and said pivoted member, valvular means controlling the admission of air to and exhaustion of air from said bellows including a control element supported and movable with and relative to said pivoted member, spring means constantly urging said control element toward contacting relation with respect to said foot pedal and simultaneously to a position in which the interior of said bellows will be subjected to atmospheric pressure, said foot pedal being movable toward said pivoted member whereby to move said control element to a position in which the interior of said bellows is closed to communication to the atmosphere and open to communication with a source of suction, the construction and arrangement being such that movement of said pivoted member under the influence of suction within said bellows tends to separate said pivoted member and said foot pedal whereby to permit movement of said control element to a position in which the interior of said bellows is cut off from communication with said source of suction, all of the aforementioned parts constituting a unitary assemblage applicable to and removable from a motor vehicle solely by securement of said base plate to and removal of said base plate from, respectively, said motor vehicle.

8. In a device of the type described, in combination, a foot pedal, a pivotal mounting for said pedal, a member pivoted to said foot pedal about a line parallel with respect to the pivotal axis of said foot pedal but spaced therefrom, power means for effecting pivotal movement of said pivoted member, a member to be actuated operatively connected to said second member between the resultant line of force of said power actuated means and the pivotal axis of said pivoted member, control means for said power actuated means, and a control element for said control means movably associated with said pivoted member and engageable by said foot pedal for effecting operation thereof.

9. In a motor vehicle having a floor part, the combination of control mechanism comprising a supporting member secured to said floor part, a pair of relatively movable members movably supported by said supporting member above said floor part, pressure operated means interconnecting said supporting member and one of said pair of members for effecting movement of the latter towards the former, valvular means for controlling said pressure actuated means and including a control element carried by one of said pair of members movable relative to the other of said pair of members and extending into cooperative relationship with respect to said other of said movable members whereby its movement is controlled by relative movement between said pair of relatively movable members, a master cylinder for a hydraulic braking system fixed with respect to said base member, a plunger in said cylinder, and means interconnecting said plunger with said one of said members.

10. In a motor vehicle having a floor part, the combination with said floor part of a base member secured to said floor part, an actuating member pivotally mounted on said base member in superposed relation with respect thereto, a foot pedal pivotally supported by said base member above said actuating member, pressure actuated means interposed between said actuating member and said base member, valvular means for controlling the flow of fluid to said pressure actuated means including a control element interposed between said actuating member and said foot pedal for actuation upon relative movement between said foot pedal and said actuating member, a cylinder carried by said base member and projecting downwardly therefrom to a position below said floor part, and a piston in said cylinder operatively connected to said actuating member for movement thereby upon relative movement thereof with respect to said base member.

11. In a motor vehicle having a floor part, the combination with said floor part of a base member secured thereto, an actuating member pivotally mounted with respect said base member, a foot pedal pivotally supported by said base member, pressure actuated means interposed between said actuating member and said base member, valvular means for controlling the flow of fluid to said pressure actuated means including a control element interposed between said actuating member and said foot pedal for actuation upon relative movement between said foot pedal and said actuating member, a cylinder carried by said base member, a piston in said cylinder operatively connected to said actuating member for movement thereby upon relative movement thereof with respect to said base member, and a liquid reservoir for said cylinder carried by said base member and operatively associated with said cylinder, said base member and all the aforementioned parts carried thereby constituting a unitary assemblage applicable to and removable from said floor part by securement of said base plate thereto and removal of said base plate therefrom.

12. In a device of the type described, in combination, a base member, an actuating member pivotally mounted with respect thereto, a foot pedal pivotally supported by said base member, pressure actuated means comprising a bellows having the opposite ends thereof sealed and secured to said base member and said actuating member, respectively, for effecting movement of said actuating member in an operative direction, valvular means for controlling the flow of fluid to said pressure actuated means including a control element interposed between said actuating member and said foot pedal for actuation upon relative movement between said foot pedal and said actuating member, a cylinder carried by said base member, a piston in said cylinder, and means extending into the interior of said bellows and connected to said actuating member for effecting actuation of said piston.

13. In a motor vehicle having a floor part and a clutch or brake pedal lever projecting therethrough, the combination of a base member secured to said floor part about said lever, a foot pedal and an actuating member pivotally associated with each other with said actuating member interposed between said base member and said foot pedal, said actuating member being connected to said lever, a bellows interconnecting said base member and said actuating member for effecting actuation of said actuating member in opposition to the resistance of said lever to movement in one direction, valvular means carried by said actuating member for controlling the flow of fluid to and from the interior of said bellows and including a movable control element arranged for actuation by said foot pedal, and means constantly urging said control element toward an inoperative position.

14. In a booster mechanism for the braking system of a motor vehicle, in combination, an actuating member for the brakes, power actuated means for actuating said actuating member, control means for said power actuated means including a movable control element carried by and movable with respect to said actuating member, a foot pedal arranged in overlying relationship with respect to said actuating member operatively associated with said control element to effect actuation thereof in one direction upon movement of said foot pedal toward said actuating member, and inertia operated means operatively interconnected between said actuating member and said foot pedal operable to resist movement of said foot pedal in an operative direction upon abnormal deceleration of the associated vehicle.

15. In a booster mechanism for the braking system of a motor vehicle, in combination, an actuating member for the brakes, power actuated means for actuating said actuating member, control means for said power actuated means including a movable control element carried by and movable with respect to said actuating member, a foot pedal arranged in overlying relationship with respect to said actuating member operatively associated with said control element to effect actuation thereof in one direction upon movement of said foot pedal toward said actuating member, inertia operated means operatively interconnected between said actuating member and said foot pedal comprising a weighted mass pivotally mounted upon said actuating member, and arms interposed between said actuating member and said foot pedal adapted for actuation upon relative movement of said mass in one direction about its pivotal axis to resist movement of said foot pedal toward said actuating member.

16. In a motor vehicle having a floor part and an actuating member projecting through said floor part and movable in a direction transversely to the plane thereof, the combination of control mechanism comprising a base member fixed to said floor part about said actuating member, an operating member pivotally supported by said base member for movement toward and away therefrom and operatively connected to said actuating member, pressure actuated means interconnecting said base and operating members and adapted to effect relative movement therebetween, a control element carried by said operating member and for controlling actuation of said pressure actuated means by relative movement with respect to said operating member, and a pedal pad movably supported by said base member for relative movement with respect to said operating member for effecting operation of said control element, spring means acting through said control element to constantly urge said pedal pad towards one limit of its movable position, and means cooperating between said pedal pad and said operating member limiting said relative movement of said pedal pad under the influence of said spring means.

17. In a motor vehicle having a floor part and an actuating member projecting through said floor part and movable in a direction transversely to the plane thereof, the combination of control mechanism comprising a base member fixed to said floor part about said actuating member, a pedal pad pivotally supported upon said base member, an operating member pivotally supported by said pedal pad for movement toward and away from both said pedal pad and said base member and interposed therebetween and operatively connected to said actuating member, fluid actuated means interposed between said operating member and said base member and operable to effect movement of said operating member towards said base member with said actuating member, and a control valve for controlling actuation of said pressure actuated means including a control element carried by said operating member and positioned for actuation by said pedal pad, the pivotal axes of said pedal pad and said operating member being arranged in spaced relation with respect to each other.

18. In an automobile having a toe board and brake mechanism including a brake lever extending through said toe board, the combination of a pair of relatively movable members overlying the upper end of said lever and at least one of said members operatively engaging the same, pressure operated means interconnecting said one of said members and said toe board for effecting movement of said one of said members toward said toe board and to simultaneously move said lever in a brake applying direction, valvular means for controlling said pressure actuated means and including a control element carried by one of said pair of members movable relative to the other of said pair of members and extending into cooperative relationship with respect to said other of said movable members whereby its movement is controlled by relative movement between said pair of relatively movable members, all of said members and means forming a unitary structure applicable to and removable from a motor vehicle as such by securing said pressure actuated means to said toe board and said one of said members in position overlying said lever.

GILBERT E. PORTER.